United States Patent
Jin

(10) Patent No.: US 8,301,009 B2
(45) Date of Patent: Oct. 30, 2012

(54) DETAILED INFORMATION PROVIDING METHOD AND APPARATUS OF PERSONAL VIDEO RECORDER

(75) Inventor: Ho Jin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1338 days.

(21) Appl. No.: 11/968,410

(22) Filed: Jan. 2, 2008

(65) Prior Publication Data

US 2008/0304812 A1    Dec. 11, 2008

(30) Foreign Application Priority Data

Jun. 11, 2007    (KR) .................... 10-2007-0056763

(51) Int. Cl.
*H04N 7/025*        (2006.01)
*H04N 21/23*        (2006.01)
*H04N 21/431*       (2006.01)

(52) U.S. Cl. ........ 386/240; 386/239; 386/291; 386/297; 725/37; 725/39; 725/51

(58) Field of Classification Search .................. 386/240, 386/297
See application file for complete search history.

(56) References Cited

U.S. PATENT DOCUMENTS

| 2002/0108060 A1* | 8/2002 | Takamoto et al. ............ 713/201 |
| 2002/0174430 A1* | 11/2002 | Ellis et al. ........................ 725/46 |
| 2003/0110486 A1* | 6/2003 | Dew et al. ........................ 725/24 |
| 2003/0226147 A1* | 12/2003 | Richmond et al. ............. 725/51 |
| 2004/0064730 A1* | 4/2004 | Kamiyama et al. ........... 713/201 |
| 2005/0210501 A1* | 9/2005 | Zigmond et al. ................ 725/32 |
| 2008/0098433 A1* | 4/2008 | Hardacker et al. .............. 725/52 |
| 2008/0109850 A1* | 5/2008 | Gibbon et al. .................. 725/46 |
| 2008/0124055 A1* | 5/2008 | Shahraray et al. ............. 386/124 |
| 2008/0189736 A1* | 8/2008 | Edwards et al. ................ 725/34 |

* cited by examiner

*Primary Examiner* — Thai Tran
*Assistant Examiner* — Alexander Lagor
(74) *Attorney, Agent, or Firm* — Sughrue Mion, PLLC

(57) ABSTRACT

Provided are a detailed information providing method and apparatus in content storage apparatus that automatically provide a user with desired broadcast information in synchronization with the Internet. The detailed information providing method includes: when a recording operation that records content to the content storage apparatus starts, requesting an information search of a web server based on information on a broadcast currently being recorded and simultaneously extracting broadcast related detailed information from a broadcast signal of the broadcast currently being recorded; and when the recording operation stops, creating a user interface of a recording list based on an Internet-based broadcast related detailed information searched by the web server and the broadcast related detailed information extracted from the broadcast signal.

22 Claims, 9 Drawing Sheets

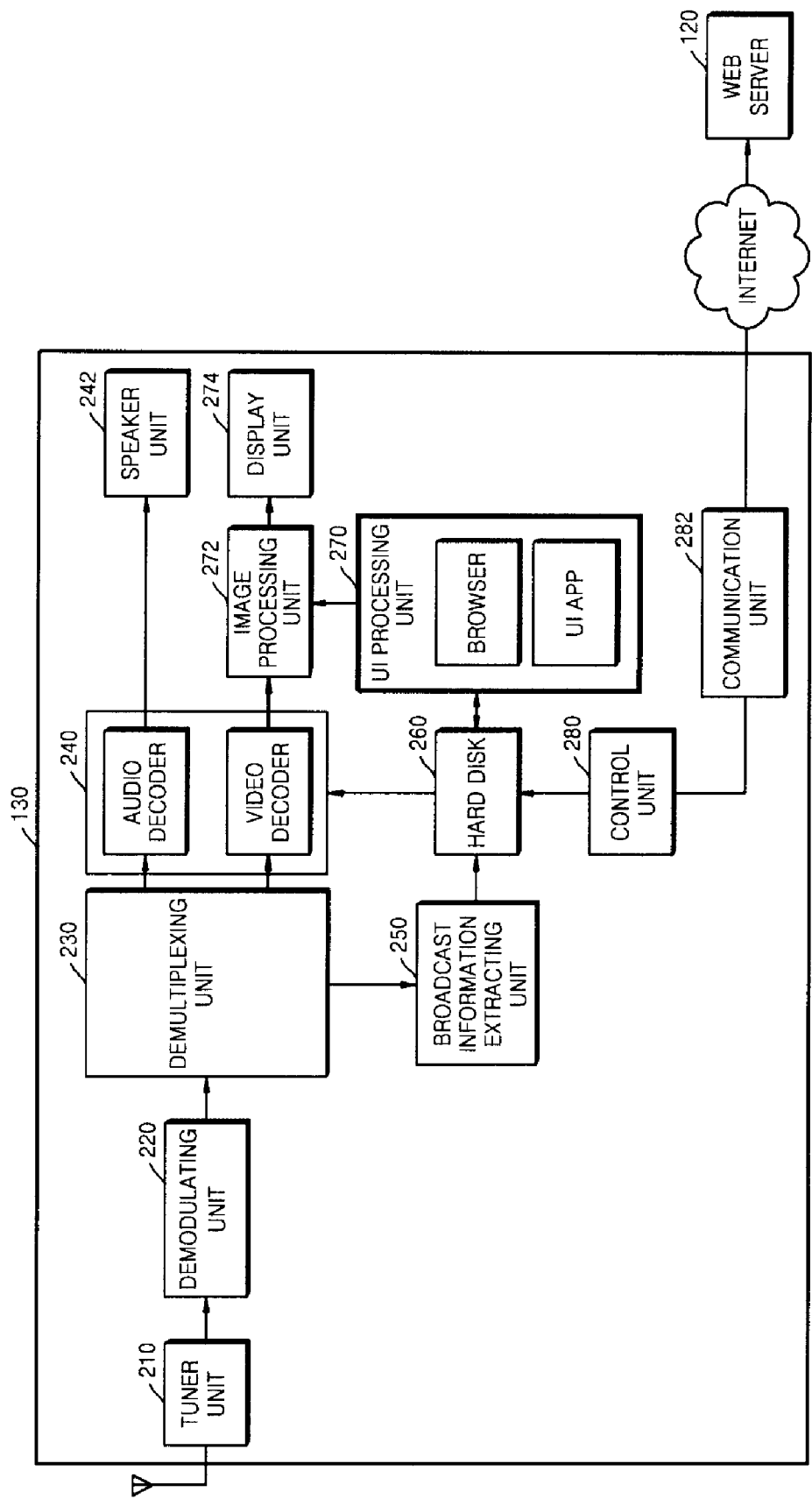

DETAILED INFORMATION PROVIDING METHOD AND APPARATUS OF PERSONAL VIDEO RECORDER

CROSS-REFERENCE TO RELATED PATENT APPLICATIONS

This application claims priority from Korean Patent Application No. 10-2007-0056763, filed on Jun. 11, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a detailed information providing system, and more particularly, to a detailed information providing method and apparatus of a content storage apparatus that automatically provides a user with broadcast information in linkage with the Internet.

2. Description of the Related Art

Content storage apparatuses, such as Personal Video Recorders (PVRs), are used to store digital broadcasts in a hard disk, provide a recording function, a time shift function, an instant replay function, and other various trick play functions.

Furthermore, PVRs allow a user to store high-definition digital broadcasts in a hard disk and reproduce them whenever they want, and provide various additional service functions.

In particular, a program summary function allows the user easy access to recorded programs and to identify a number of programs stored in a hard disk.

However, a conventional PVR as shown in FIG. 1A provides the user with a broadcast list drawn up based on an electronic program guide (EPG) along with simple information, such as a program title, date, recording duration, data capacity, etc., without detailed information on the broadcasts.

Therefore, in the case where a large amount of content is recorded in a conventional PVR, the user cannot obtain detailed information on the recorded programs apart from the title information recorded in a list. For example, a user cannot obtain plot information about each episode of a soap opera series based on the title of the soap opera series alone.

SUMMARY OF THE INVENTION

The present invention provides a detailed information providing method and apparatus of a content storage apparatus that automatically provide broadcast related detailed information received from a broadcasting system and provide reproducing list related detailed information in linkage with the Internet based on keywords provided from the broadcasting system.

According to an aspect of the present invention, there is provided a detailed information providing method of a content storage apparatus, the method including: when a recording operation that records content to the content storage apparatus starts, requesting an information search of a web server based on information on a broadcast currently being recorded and simultaneously extracting broadcast related detailed information from a broadcast signal of the broadcast currently being recorded; and when the recording operation stops, creating a user interface of a recording list based on an Internet-based broadcast related detailed information searched by the web server and the broadcast related detailed information extracted from the broadcast signal.

According to another aspect of the present invention, there is provided a detailed information providing method of a content storage apparatus connected with a web server, the method including: when a recording operation that records content to the content storage apparatus starts, extracting search information and broadcast related information based on broadcast information; when the recording operation stops, transmitting the search information to the web server via the Internet and making a request for detailed information management based on the search information; and receiving a detailed information page created based on the search information from the web server and creating a web-browser based detailed recording list based on the received web-based detailed information page and the extracted broadcast related information.

According to another aspect of the present invention, there is provided a detailed information providing method of a web server connected with a content storage apparatus via the Internet, the method including: searching for broadcast related information when a request for information search based on broadcast information is received whenever the content storage apparatus records a broadcast; creating a web-based broadcast related detailed information page based on found broadcast related information and providing the web-based broadcast related detailed information page to the content storage apparatus when receiving a request for the broadcast related detailed information from the content storage apparatus.

According to another aspect of the present invention, there is provided a detailed information providing apparatus of a content storage apparatus, the apparatus including: a broadcast receiving unit selecting a particular broadcast and separating a broadcast signal and broadcast related detailed information data from the particular broadcast; a broadcast reproducing unit decoding the broadcast signal received from the broadcast receiving unit into a video signal and an audio signal; and a recording information management unit transmitting recorded broadcast information to a registered web server whenever a broadcast is recorded and creating a detailed recording list based on recorded broadcast related detailed information found by the web server based on the recorded broadcast information and the broadcast related detailed information data received from the broadcast receiving unit.

BRIEF DESCRIPTION OF THE DRAWINGS

The above and other features and advantages of the present invention will become more apparent by describing in detail exemplary embodiments thereof with reference to the attached drawings in which:

FIG. 2 is a detailed block diagram of the PVR in FIG. 1B according to an exemplary embodiment of the present invention;

DETAILED DESCRIPTION OF EXEMPLARY EMBODIMENTS OF THE INVENTION

Exemplary embodiments of the present invention will now be described with reference to the appended drawings.

Figure 1A:
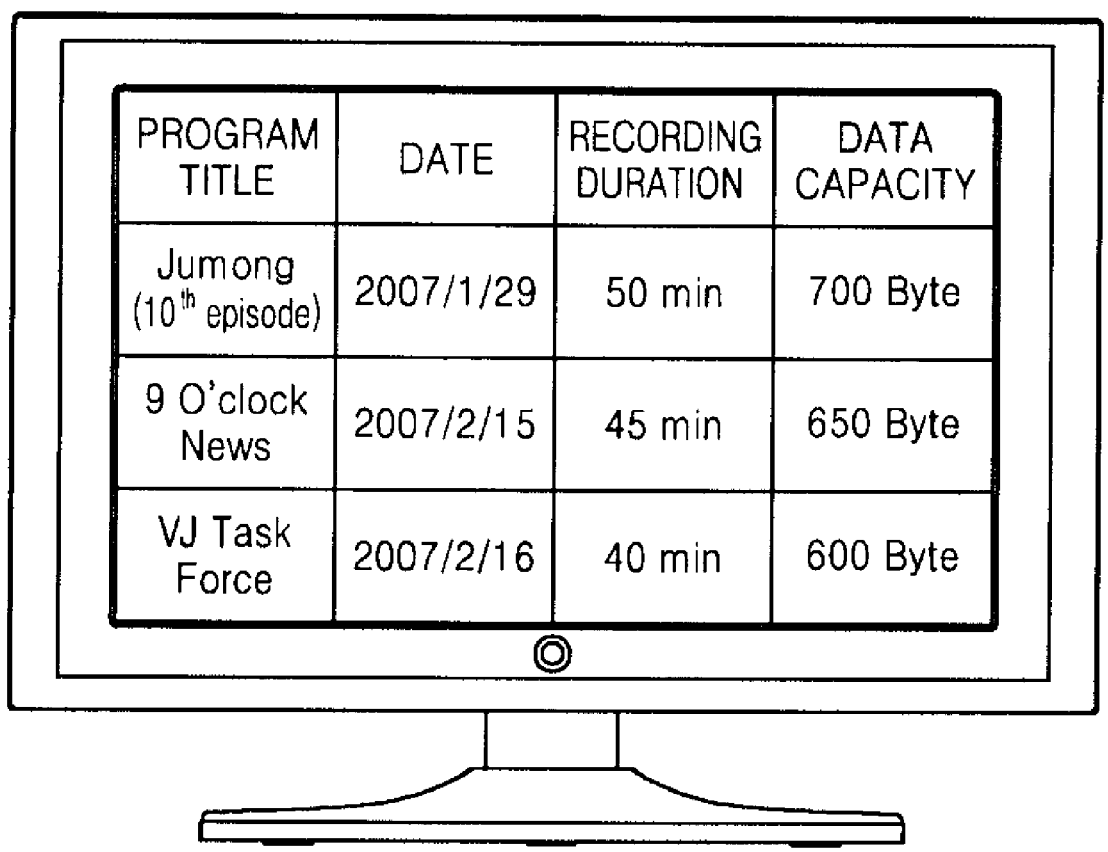
FIG. 1A illustrates a user interface (UI) screen of a conventional personal video recorder (PVR)
Figure 1B:
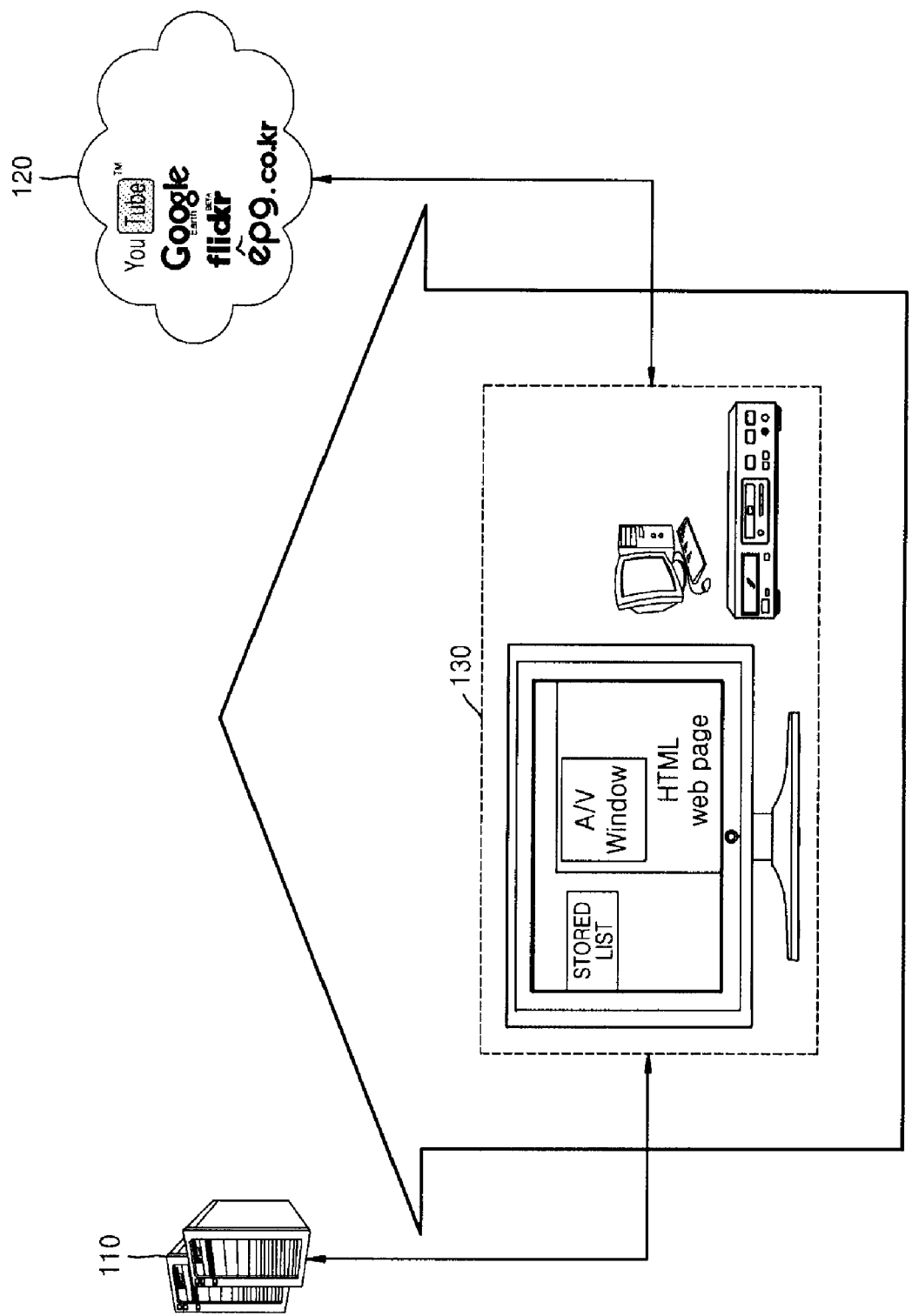
FIG. 1B illustrates a detailed information providing apparatus of a PVR according to an exemplary embodiment of the present invention.

FIG. 1B illustrates a detailed information providing apparatus of a personal video recorder (PVR) according to an exemplary embodiment of the present invention.

Referring to FIG. 1B, the detailed information providing apparatus according to the current exemplary embodiment of the present invention includes a broadcasting system 110, a web server 120, and a PVR 130.

The broadcasting system 110 transmits broadcast program related data or program guide information as well as video broadcasts. The broadcast program related data includes, for example, plot information in an electronic program guide (EPG), regional information, and other types of information. In addition, the program guide information is generally known as EPG.

The web server 120 includes a detailed information management system of a PVR, which provides a detailed information service relating to recorded broadcasts. For example, the web server 120 may a) provide a broadcast related detailed information search service according to the channel, broadcast title, and time information, b) provide keywords related to a particular program in the form of a tag and a URL, and c) provide an advertisement related to the particular broadcast on a detailed information page. The web server 120 may also provide detailed broadcast information, a tag, an advertisement, and a program plot service that allows viewers to share their opinion through a formalized web service, such as a blog. In particular, when a search request for information on a broadcast to be recorded is received from the PVR 130, the web server 120 searches for detailed information related to the recorded broadcast, and creates a web-based detailed information page based on the found detailed information related to the recorded broadcast. When a request for the detailed information on the recorded broadcast is received from the PVR 130, the web server 120 provides the web-based detailed information page to the PVR 130.

The PVR 130 may be either an integrated type PVR, which can be installed in a TV, or a stand-alone type PVR using a set top box (STB) or external device. In addition, any device including a TV tuner, such as a personal computer (PC), may support functions of the PVR 130. The PVR 130 stores and manages broadcast signals together with information data, and manages broadcast related detailed information in connection with the web server 120 according to the title, content and duration of the stored broadcasts, etc. In addition, the broadcast related detailed information may be stored in a storage space of the PVR 130 or the web server 120. The broadcast related detailed information may be stored in various data formats. For example, when the broadcast related detailed information is stored in an extensible markup language (XML) format, the broadcast related detailed information can be linked easily with a web page. The PVR 130 may reproduce the broadcast related detailed information using a user interface (UI) of a TV itself or using a web browser or Internet blog as a UI. The PVR 130 transmits to the web server 120, which has been registered, recorded broadcast information, for example, about the channel, broadcast title, plot information provided by the broadcasting station, etc. in the form of a blog whenever recording a broadcast. Then, the web server 120 creates a web page supporting a plot, a tag service, a preview, a search, etc, using the broadcast related words and the plot information.

When recording starts, the PVR 130 makes a request for a recorded broadcast based search of the web server 120 and extracts broadcast related detailed information from a broadcast signal received from the broadcasting system 110. When recording stops, the PVR 130 makes a request for the recorded broadcast related detailed information search of the web server 120 and creates a detailed recording list based on the broadcast related detailed information found by the web server 120 and the broadcast related detailed information extracted from the broadcast signal. In addition, upon starting and stopping of recording, the PVR 130 makes a request for information management on its own blog of the web server 120 using an ID and a password and accesses the blog to identify detailed information of the PVR 130. Here, a reproducing command in a web-based PVR list is transmitted to the PVR 130 according to a controlling method, such as plug-in/Active X, etc.

FIG. 2 is a detailed block diagram of the PVR 130 according to an exemplary embodiment of the present invention.

Referring to FIG. 2, the PVR 130 according to the current exemplary embodiment of the present invention may be roughly divided into a broadcast receiving unit, a broadcast reproducing unit, and a recording information management unit. The broadcast receiving unit includes a tuner unit 210, a demodulating unit 220, and a demultiplexing unit 230. The broadcast reproducing unit includes a decoding unit 240, an image processing unit 272, a speaker unit 242, and a display unit 274. The recording information management unit includes a broadcast information extracting unit 250, a hard disk 260, a control unit 280, a UI processing unit 270, and a communication unit 282.

The tuner unit 210 selects a broadcasting channel or a program provided by a broadcasting station or external program provider via an antenna.

The demodulating unit 220 demodulates a video signal, an audio signal, and additional data from the broadcast signal of the broadcasting channel selected by the tuner unit 210.

The demultiplexing unit 230 separates the video signal, the audio signal and the additional data from a demodulated signal output from the demodulating unit 220. Here, the additional data includes broadcast related detailed information, such as EPG plot data, etc.

The decoding unit 240 includes an audio decoder and a video decoder and decodes the video signal and the audio signal separated by the demultiplexing unit 230.

The image processing unit 272 synthesizes the video signal decoded by the decoding unit 240 and a UI screen processed by the UI processing unit 270.

The speaker unit 242 reproduces the audio signal.

The display unit 272 reproduces the video signal.

The broadcast information extracting unit 250 extracts the broadcast related detailed information, such as EPG plot data, etc., from the additional data separated by the demultiplexing unit 230

The hard disk 260 stores the broadcast signal and the broadcast related detailed information.

The UI processing unit 270 provides a UI for reproducing the detailed information after completion of the recording. Here, the detailed information may be reproduced through a UI application of the TV itself or in the form of a browser-based web page.

The communication unit 282 transmits to and receives from a web server 120 broadcast related data or a web page in the form of a blog. The communication unit 282 may be implemented with a commonly-used modem.

The control unit 280 controls broadcast recording and reproduction according to a user's input, provides the broadcast related detailed information extracted by the broadcast information extracting unit 250 and the Internet-based broadcast related detailed information found by the web server 120 to the UI processing unit 270 whenever a broadcast is recorded, and selects the UI application or the browser in the UI processing unit 270.

Figure 3:
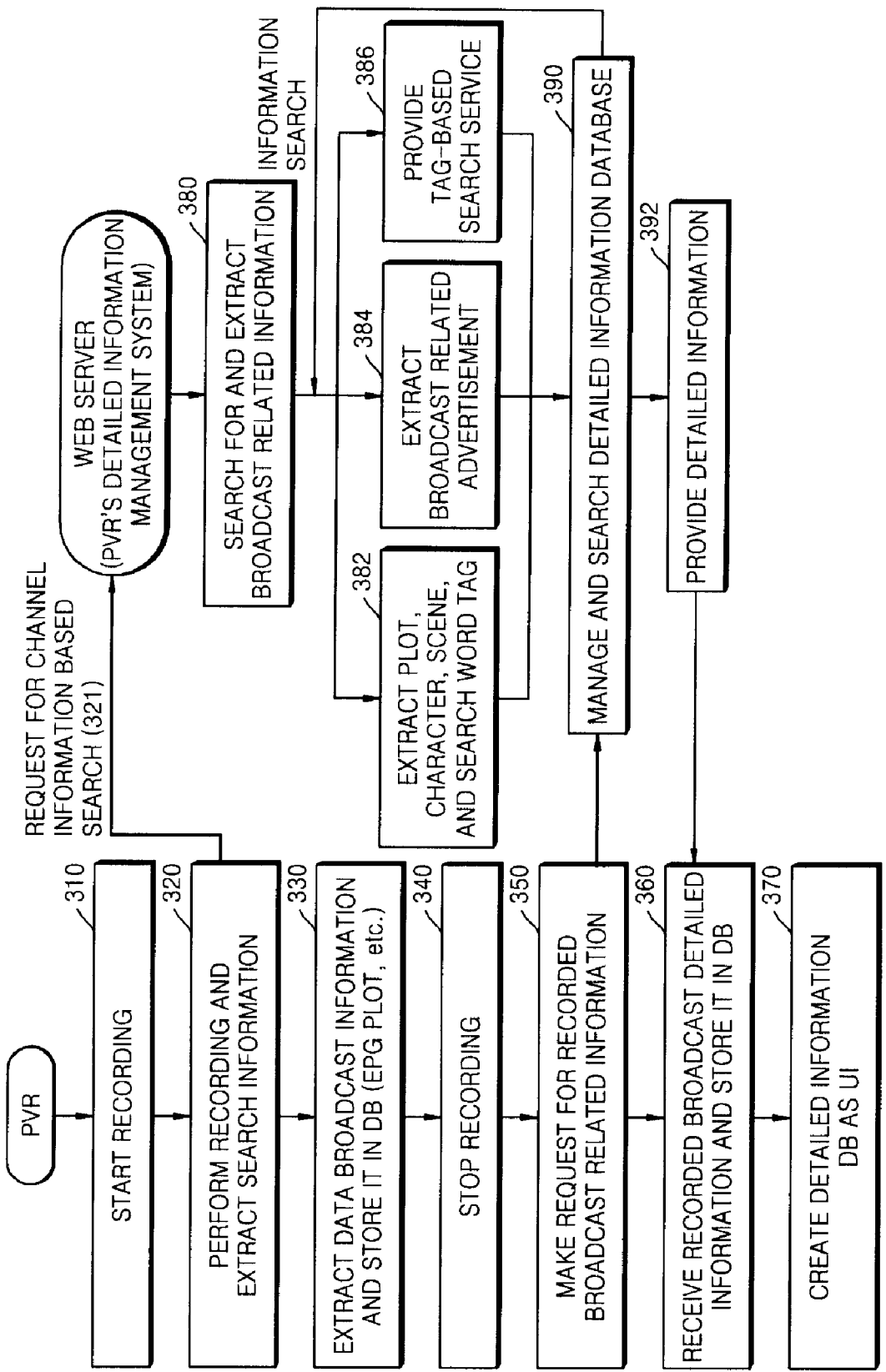
FIG. 3 is a flowchart of a detailed information providing method in a PVR, according to an exemplary embodiment of the present invention.

FIG. 3 is a flowchart of a detailed information providing method in a PVR, according to an exemplary embodiment of the present invention.

When a recording operation starts (operation 310), the PVR records a particular broadcast and extracts broadcast related search information with reference to EPG information or broadcast data being received (operation 320). The broadcast related search information may include, for example, a program's title, a broadcasting channel, recording duration, etc.

Then, the PVR makes a request for an information search of a web server based on the broadcast related search information such as channel information (operation 321). Here, the web server may include a detailed information management system of the PVR.

Here, when a request for an information search for detailed information on the broadcast being recorded by the PVR is received, the web server searches for the broadcast related search information and extracts broadcast related detailed information (operation 380). For example, the web server may search for the detailed information based on the broadcast related search information, extract a plot, characters, scenes, and a search word tag, all of which are related to the recorded broadcast (operation 382), extract advertisements related to the broadcast (operation 384), and provide a tag-based search service (operation 386). Next, the web server stores a list of the found recorded broadcast detailed information in a detailed information database (operation 390).

Next, the PVR extracts data broadcast information, such as EPG plot information, from the broadcast signal being recorded and stores the extracted data broadcast information in a database (operation 330).

Next, once the recording of the particular program stops (operation 340), the PVR requests the web server for detailed information on the recorded broadcast (operation 350). In particular, the web server searches the database for the detailed information on the recorded broadcast program (operation 390). In addition, the web server provides the PVR with the broadcast related detailed information (operation 392).

Next, the PVR receives the detailed information on the particular recorded program from the web server and stores the detailed information in the database (operation 360). Methods of storing detailed information from the Internet may be classified into two types. A first detailed information storing method comprises storing Internet-based detailed information received from the web server in a database of the PVR. In this case, the PVR can provide the detailed information through a detailed information UI even when the PVR is disconnected from the network. A second detailed information storing method comprises storing a URL of the detailed information received from the web server or an Open API related to the detailed information in the database of the PVR. In this case, the particular URL or the service related Open API are retrieved onto a detailed information UI of the PVR. At this time, whenever reproducing the detailed information UI, the PVR makes a request for up-to-date detailed information linked to the Internet and receives the up-to-date detailed information.

Next, the PVR creates a detailed information database of the recorded broadcast program as a UI (operation 370).

Figure 4:
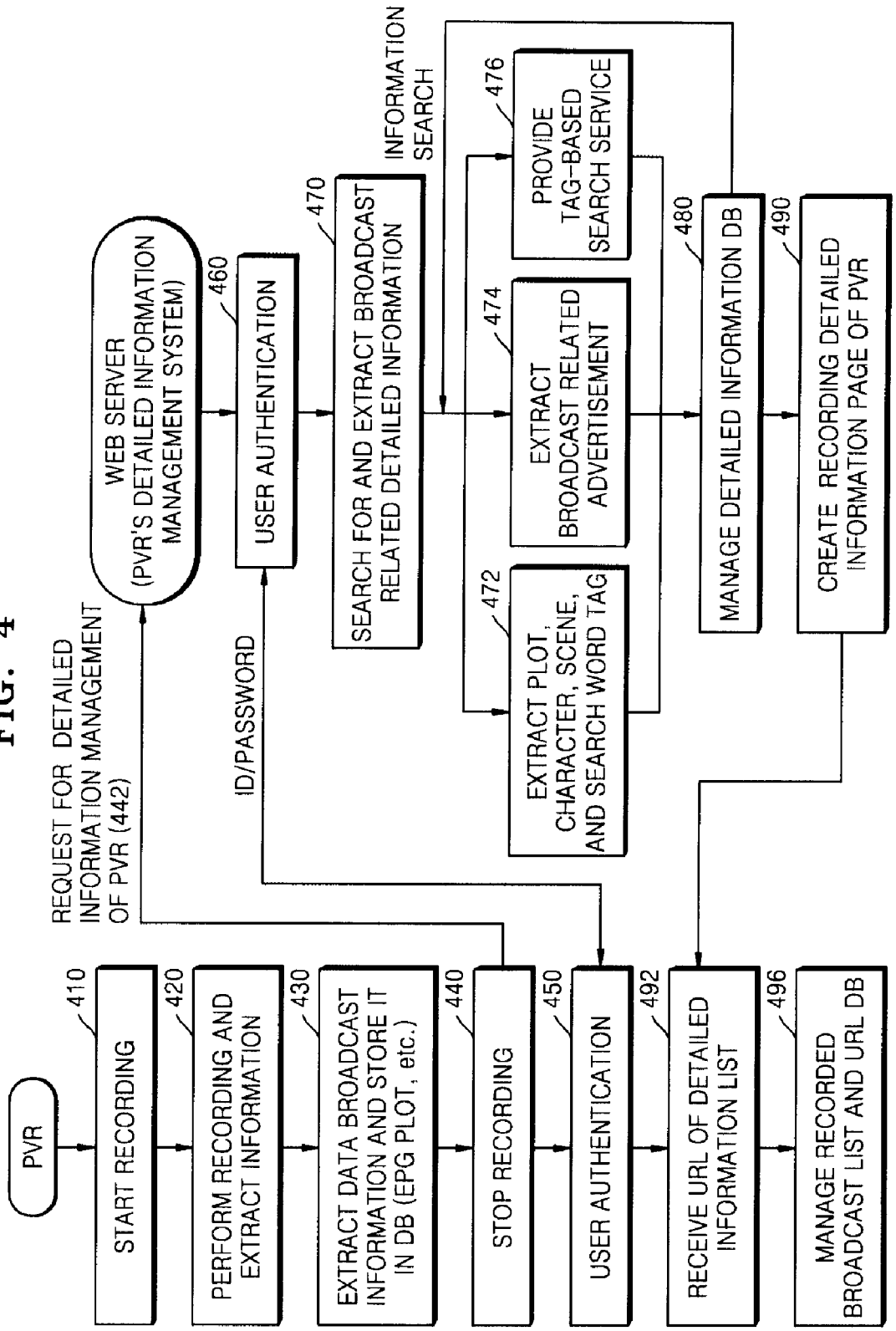
FIG. 4 is a flowchart illustrating a method of managing detailed information of a PVR provided from a web server, according to an exemplary embodiment of the present invention.

FIG. 4 is a flowchart illustrating a method of managing detailed information of a PVR in a web server, according to an exemplary embodiment of the present invention.

When a recording operation starts (operation 410), the PVR records a particular broadcast program and extracts broadcast related information from broadcasting signal to make a request for a detailed information search (operation 420).

Next, the PVR extracts data broadcast information, such as EPG plot information, from the broadcast signal being recorded and stores the extracted data broadcast information in a database (operation 430).

Next, once the recording of the particular program stops (operation 440), the PVR transmits a request for collecting recorded broadcast related information (a channel, a program title, a plot, etc.) in a formalized web form, such as a blog, to the web server, and makes a request for managing detailed information on the PVR based on the recorded broadcast related information (operation 442). Here, user authentication between the web server and the PVR is performed using an ID and a password (operations 450 and 460). If the user authentication is successful, the web server searches for the broadcast related detailed information to extract the broadcast related detailed information (operation 470). In other words, the web server searches for detailed information based on the broadcast related information, extracts a plot, characters, scenes, search word tags, etc., which are related to the recorded broadcast (operation 472), extracts advertisements related to the broadcast (operation 474), and provides a tag-based search service (operation 476). Next, the web server manages the found recorded broadcast related detailed information using a detailed information database (operation 480).

Next, the web server creates a recording detailed information page of the PVR, such as a blog, based on the recorded broadcast related detailed information stored in the detailed information database (operation 490). Here, a search URL, a broadcast related advertisement, etc. are inserted into the recording detailed information page of the PVR, and a URL of the detailed information page is transmitted to the PVR.

Next, the PVR receives the URLs of the recording detailed information page (operation 492) and manages a recorded broadcast list and a URL database (operation 496). Here, the URL database stores the URLs of the recording detailed information page.

Figure 5:
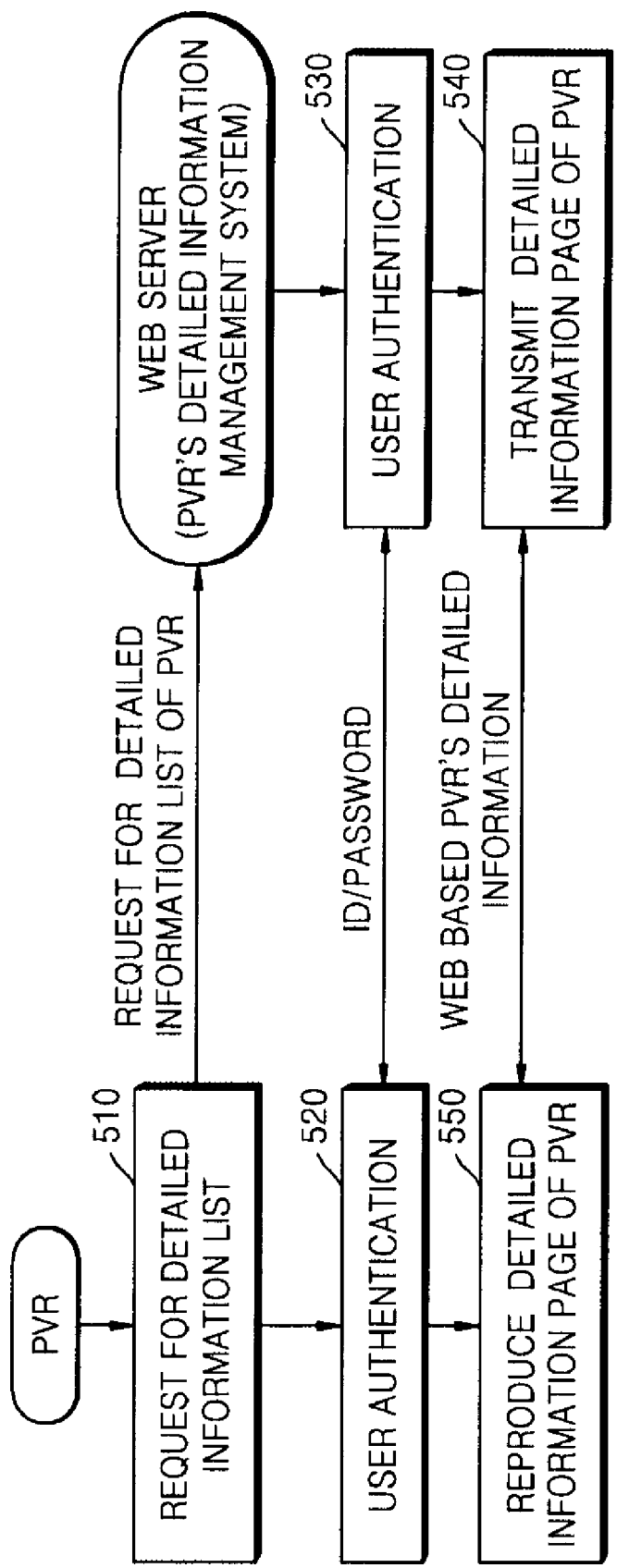
FIG. 5 is a flowchart illustrating a method of producing detailed information of a PVR provided from a web server, according to an exemplary embodiment of the present invention.

FIG. 5 is a flowchart illustrating a method of producing detailed information of a PVR provided from a web server, according to an exemplary embodiment of the present invention.

Initially, the PVR requests the web server for a detailed information list of the PVR (operation 510).

Next, user authentication between the web server and the PVR is performed using an ID and a password (operations 520 and 530).

Next, if the user authentication is successful, the user requests the web server for a particular detailed information page of the PVR. Here, the web server transmits the requested detailed information page of the PVR to the PVR through a web browser (operation 540).

Next, the PVR reproduces the web-based detailed information page of the PVR received from the web server through a UI (operation 550).

Figure 6:
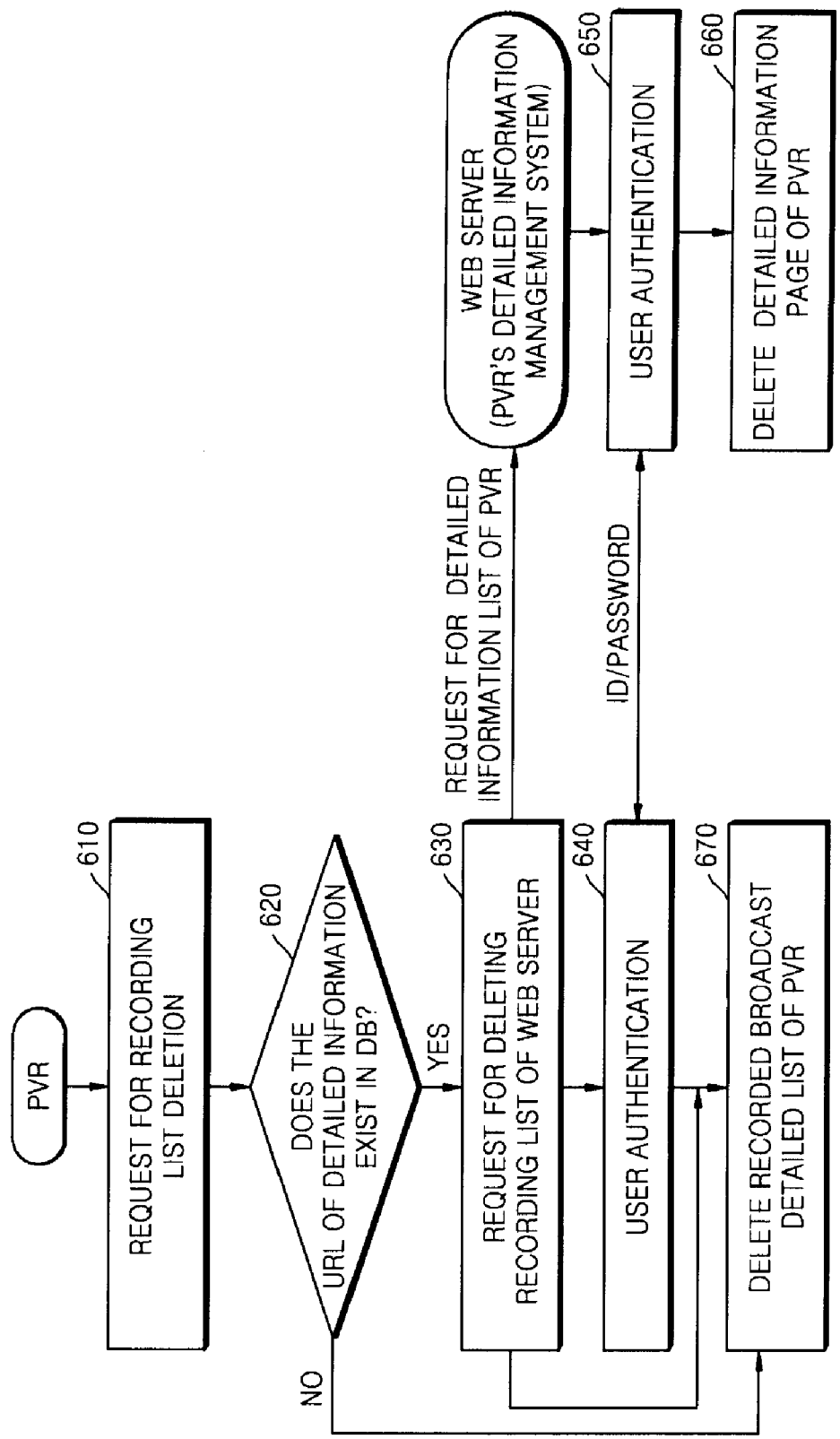
FIG. 6 is a flowchart illustrating a method of deleting a recording list of a PVR, according to an exemplary embodiment of the present invention.

FIG. 6 is a flowchart illustrating a method of deleting a recording list of a PVR, according to an exemplary embodiment of the present invention.

Initially, when a request for deleting a recording list of the PVR is received (operation 610), the PVR checks whether a relevant service URL exists in a detailed information database (operation 620).

If the relevant service URL exists in a detailed information database, the PVR makes a requests for deleting a detailed recording list of the PVR of the web server that manages detailed information of the PVR (operation 630). On the other hand, if the relevant service URL does not exist in a detailed information database, the PVR deletes a recorded broadcast detailed list of the PVR (operation 670).

In addition, if the detailed information database exists in the web server, after operation 630, user authentication between the web server and the PVR is performed using an ID and a password (operations 640 and 650). If the user authentication is successful, the web server deletes the detailed recording list of the PVR (operation 660). In addition, the PVR deletes the recorded broadcast detailed list of the PVR (operation 670).

Figure 7:
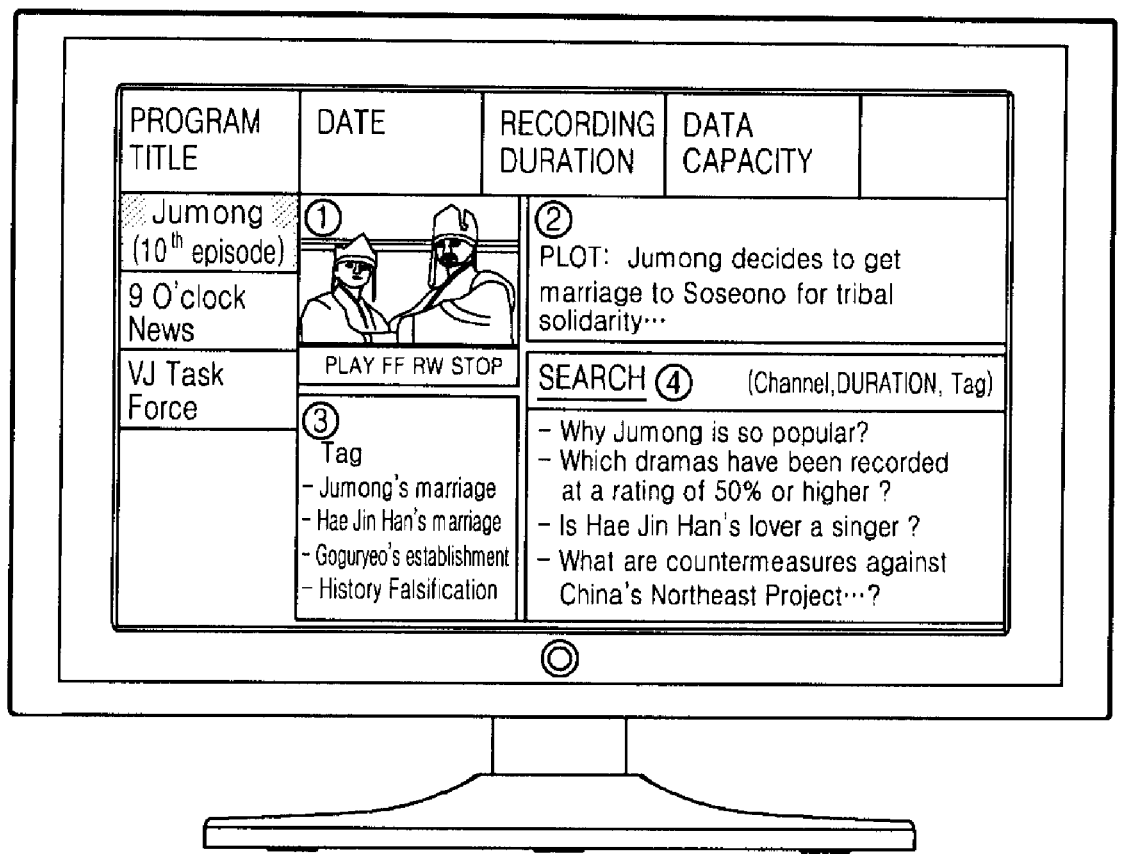
FIG. 7 is a view of a UI screen providing detailed information of a PVR, according to an exemplary embodiment of the present invention.

FIG. 7 is a view of a UI screen providing detailed information of a broadcast stored on a PVR, according to an exemplary embodiment of the present invention. A UI of the conventional PVR shown in FIG. 1A provides information, such as a program title, date, recording time, data capacity, etc. However, referring to FIG. 7, the UI screen providing detailed information of a broadcast stored on a PVR according to the current exemplary embodiment of the present invention provides various types of information related to a particular program (for example, "Jumong ($10^{th}$ episode)" in FIG. 7) in linkage with the Internet. For example, the UI screen illustrated in FIG. 7 may provide a snapshot and reproducing function ①, plot information ②, tag information ③, search information ④, Internet service, etc.

Here, the snapshot and reproducing function ① provides a scene captured during the recording of a broadcast as a snapshot, and a preview on the screen.

In addition, the plot information ② is included in the broadcast information provided by a broadcasting station, and may be provided by a web server for a broadcast program which is not provided by a broadcasting station.

The tag information ③ is provided as keywords related to the content of the recorded broadcast based on a service provided by the web server, and is also provided together with terms related with the keywords.

The search information ④ is provided through a search service using an Internet search engine based on the stored information, such as a broadcast channel, title, and time, etc. In addition, the search service may be provided to the user based on the tag information ③.

The Internet service can be provided to the user in various ways. For example, an advertisement service can be provided by automatically inserting advertisements related with a stored broadcast into the UI screen providing detailed information of the PVR so that a viewer can view an advertisement of interest by clicking on it. In addition, recording information of the PVR can be shared by a number of users when different Internet users are allowed to share opinions on a broadcast stored in the PVR.

Figure 8:
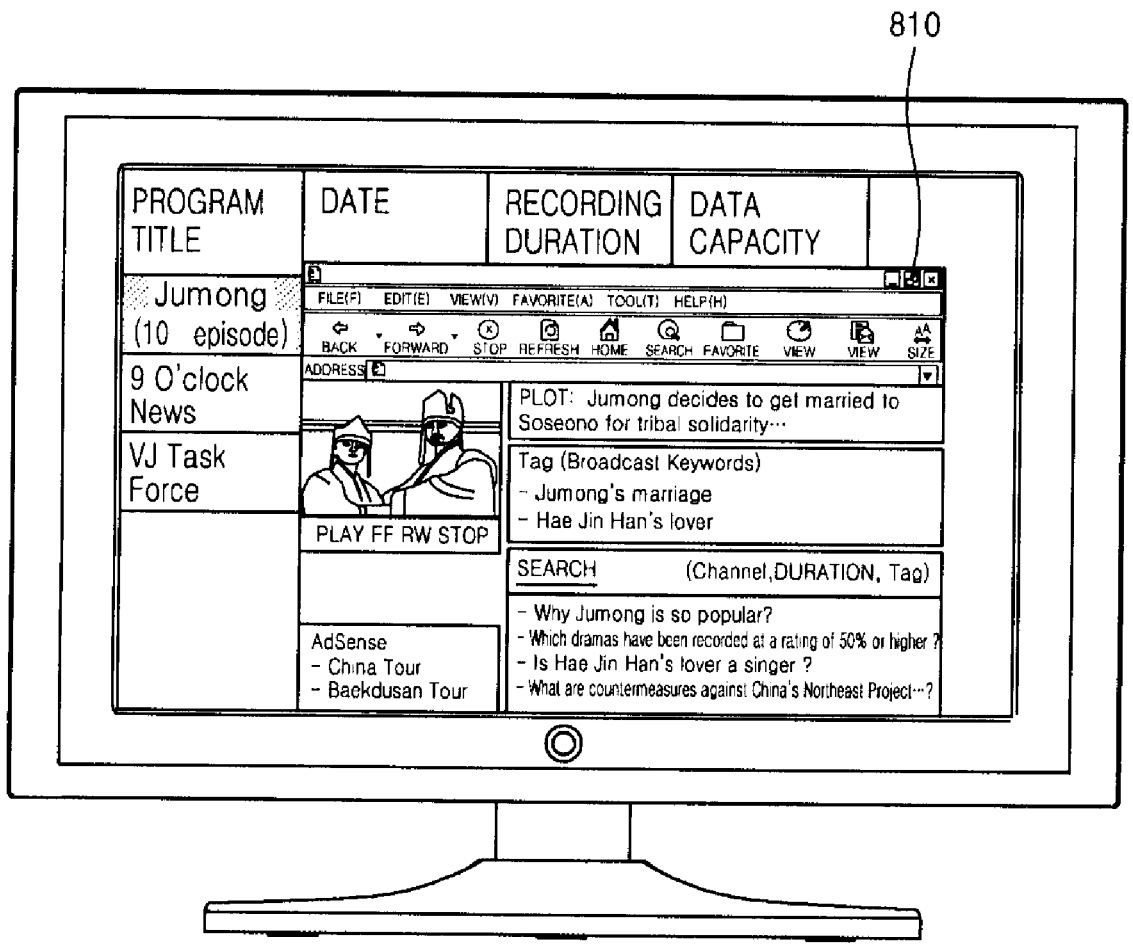
FIG. 8 is a view of a UI screen providing detailed information of a PVR in the form of a web browser, according to another exemplary embodiment of the present invention.

FIG. 8 is a view of a UI screen providing detailed information on a PVR in the form of a web browser, according to another exemplary embodiment of the present invention.

Referring to FIG. 8, when a particular recorded broadcast is selected in a recorded broadcast list of the PVR, a particular recorded broadcast blog 810 corresponding to a recorded broadcast page stored in the web server is provided to the user via the web browser. The recorded broadcast blog may include detailed information on the recorded broadcast. Therefore, functions of the Internet can be efficiently applied to the PVR by expressing the web-based detailed information UI as shown in FIG. 8 in the blog form. For example, an advertisement related to a recorded broadcast can be automatically inserted, and viewer's postscripts and opinions can be shared by a number of users. In addition, when a particular user's recorded broadcast blog page can be assessed by the public, information and the particular user's opinion on a broadcast recorded by the user can be shared by a number of Internet users.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

As described above, according to the present invention, a user's access to conventional PVR broadcast recording information is maximized. When a broadcast is recorded, various types of information related to the broadcast are automatically collected, stored, and managed. In addition, according to exemplary embodiments of the present invention, a stored broadcast list can be searched based on detailed information on a recorded broadcast, and a user can view a desired program after checking the found broadcast information. Moreover, according to exemplary embodiments of the present invention, keywords and other words related to a broadcast are automatically provided to the user based on customized broadcast related information, thereby allowing the user to easily access various types of information. Furthermore, according to exemplary embodiments of the present invention, various Internet services can be provided in linkage with the PVR, so that customized advertisements, customized search and reply services, etc., can be added to the recorded broadcast information, thereby maximizing web-users' participation and information sharing. In addition, according to the present invention, the user can be provided with an environment in which a program is reproducible based on a broadcast recording list and an environment in which various Internet services can be applied to the PVR. Additionally, while exemplary embodiments of the present invention are directed specifically toward a PVR, the present invention may be applied toward any such content storage apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A detailed information providing method of a content storage apparatus, the method comprising:
   when a recording operation that records content to the content storage apparatus starts, requesting an information search of a web server based on information on a broadcast currently being recorded and simultaneously extracting broadcast related detailed information from a broadcast signal of the broadcast currently being recorded; and
   when the recording operation stops, creating a user interface of a recording list based on an Internet-based broadcast related detailed information searched by the web server and the broadcast related detailed information extracted from the broadcast signal.

2. The detailed information providing method of claim 1, wherein the requesting the information search comprises:
   recording a particular broadcast upon starting of the recording operation;
   extracting a broadcast related search information from the broadcast signal currently being recorded; and
   requesting the information search based on the extracted broadcast related search information.

3. The method according to claim 2, wherein the broadcast related search information comprises one of a program title, a broadcasting channel and a recording duration.

4. The detailed information providing method of claim 1, wherein the creating of the user interface of the detailed recording list comprises:
   receiving a URL of the searched broadcast related detailed information from the web server; and
   storing the URL of the found broadcast related detailed information in the detailed recording list.

5. The method of claim 1, wherein the creating of the user interface of the detailed recording list comprises storing found broadcast related detailed information received from the web server.

6. The detailed information providing method of claim 1, wherein the user interface of the detailed recording list comprises one of an application of the content storage apparatus itself and a web browser.

7. The detailed information providing method of claim 1, further comprising requesting up-to-date detailed information and receiving the up-to-date detailed information linked to a corresponding URL whenever the user interface of the detailed recording list is reproduced.

8. The detailed information providing method of claim 1, further comprising inserting a recorded broadcast related tag searched by the web server into the user interface of the detailed recording list.

9. The detailed information providing method of claim 1, further comprising inserting a recorded broadcast related advertisement found by the web server into the user interface of the detailed recording list.

10. The detailed information providing method of claim 1, further comprising inserting a snapshot of the recorded broadcast into the user interface of the detailed recording list.

11. The detailed information providing method of claim 1, further comprising inserting a recorded broadcast related viewer's opinion found by the web server into the user interface of the detailed recording list.

12. The detailed information providing method of claim 1, further comprising inserting an Internet search engine into the user interface of the detailed recording list.

13. The method according to claim 1, wherein the content storage apparatus is a Personal Video Recorder (PVR).

14. The method according to claim 1, wherein the user interface of the recording list based on the Internet-based broadcast related detailed information comprises a snapshot of a scene of the recorded broadcast, plot information, tag information including keywords related to content of the recorded broadcast, and search information provided using an Internet search engine.

15. A detailed information providing method of a content storage apparatus connected with a web server, the method comprising:
   when a recording operation that records content to the content storage apparatus starts, extracting search information and broadcast related information based on broadcast information;
   when the recording operation stops, transmitting the search information to the web server via the Internet and making a request for detailed information management based on the search information; and
   receiving a detailed information page created based on the search information from the web server and creating a web-browser based detailed recording list based on the received web-based detailed information page and the extracted broadcast related information.

16. The detailed information providing method of claim 15, further comprising, when reproducing the web-browser based detailed recording list, requesting a web-based detailed information page of the web server;
   receiving the web-based detailed information page via a web browser from the web server if user authentication is successful; and
   reproducing the web-based detailed information page received from the web server via a user interface.

17. The detailed information providing method of claim 15, further comprising, when deleting the web-browser based detailed recording list, checking whether a URL of the detailed recording information exists in a database;
   making a request for deleting a corresponding detailed recording list of the web server if the URL of the detailed recording information exists in the database, and deleting the detailed recording list in the content storage apparatus if the URL of the detailed recording information does not exist in the database; and
   performing user authentication on the web server and deleting a corresponding detailed information page in the web server if the user authentication is successful.

18. The detailed information providing method of claim 15, further comprising performing user authentication on the web server whenever making a request for creating the detailed information page.

19. The detailed information providing method of claim 15, further comprising inserting at least one of a tag, an advertisement, a reply, and a search word, which are related to the recorded broadcast, into the detailed information page.

20. The detailed information providing method of claim 15, wherein the detailed information page is provided in a web page form via a web browser.

21. A detailed information providing apparatus of a content storage apparatus, the apparatus comprising:
   a broadcast receiving unit which selects a particular broadcast and which separates a broadcast signal and broadcast related detailed information data from the particular broadcast;
   wherein a recorded broadcast information is extracted from the broadcast signal;

a broadcast reproducing unit which decodes the broadcast signal received from the broadcast receiving unit into a video signal and an audio signal; and a recording information management unit which transmits recorded broadcast information to a registered web server whenever a broadcast is recorded and creating a detailed recording list based on recorded broadcast related detailed information found by the web server based on the recorded broadcast information and the broadcast related detailed information data received from the broadcast receiving unit.

22. The detailed information providing apparatus of claim 21, wherein the recording information management unit comprises:

a broadcast information extracting unit which extracts broadcast related additional data from the received broadcast signal;

a user interface processing unit which provides the broadcast related detailed information in a form of one of a predetermined user interface application and a browser-based web; and a control unit which controls recording and reproducing by the content storage apparatus, provides the broadcast related additional information extracted from the broadcast information extracting unit whenever recording is performed and the Internet-based broadcast related detailed information found by the web server to the user interface processing unit, and selects one of the user interface application and the browser in the user interface processing unit.

* * * * *